United States Patent
Lee et al.

(10) Patent No.: US 11,189,067 B2
(45) Date of Patent: Nov. 30, 2021

(54) ELECTRONIC DEVICE AND CONTENT GENERATION METHOD

(71) Applicant: Samsung Electronics Co., Ltd., Suwon-si (KR)

(72) Inventors: Younggyun Lee, Suwon-si (KR); Youngdae Lee, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/678,337

(22) Filed: Nov. 8, 2019

(65) Prior Publication Data

US 2020/0279420 A1 Sep. 3, 2020

(30) Foreign Application Priority Data

Feb. 28, 2019 (KR) .................. 10-2019-0024117

(51) Int. Cl.
*G06T 11/60* (2006.01)
*G06T 7/593* (2017.01)
*G06T 11/00* (2006.01)

(52) U.S. Cl.
CPC .............. *G06T 11/60* (2013.01); *G06T 7/593* (2017.01); *G06T 11/001* (2013.01)

(58) Field of Classification Search
None
See application file for complete search history.

(56) References Cited

U.S. PATENT DOCUMENTS

| 9,396,354 | B1 | 7/2016 | Murphy et al. |
| 2007/0200925 | A1 | 8/2007 | Kim |
| 2008/0297617 | A1 | 12/2008 | Jeong |

(Continued)

FOREIGN PATENT DOCUMENTS

| CN | 108958610 A | 12/2018 |
| EP | 1 998 556 A1 | 3/2008 |

(Continued)

OTHER PUBLICATIONS

International Search Report dated Feb. 27, 2020, issued in International Appplication No. PCT/KR2019/014286.

(Continued)

*Primary Examiner* — Yi Wang
(74) *Attorney, Agent, or Firm* — Jefferson IP Law, LLP

(57) ABSTRACT

An electronic device is provided. The electronic device includes a display, a processor operatively connected to the display, and a memory operatively connected to the processor. The memory may store instructions that, when executed, cause the processor to obtain a first image including at least one object, detect a designated region in the first image by using the at least one object, display a guide indicating the designated region and a content generation tool on the display, receive a first user input through the display for generating or editing at least one content using the content generation tool, determine attribute information about the at least one content at least partially based on the designated region or the first user input, and store the determined attribute information and the at least one content in the memory. Various other embodiments can be provided.

18 Claims, 17 Drawing Sheets

(56) References Cited

U.S. PATENT DOCUMENTS

2015/0055085 A1   2/2015  Fonte et al.
2018/0137660 A1   5/2018  De Abreu Rodriguez et al.
2018/0227482 A1   8/2018  Holzer et al.
2019/0058827 A1   2/2019  Park et al.

FOREIGN PATENT DOCUMENTS

| | | |
|---|---|---|
| JP | 2011-209887 A | 10/2011 |
| JP | 2015-146566 A | 8/2015 |
| JP | 2017-228901 A | 12/2017 |
| JP | 2018-31860 A | 3/2018 |
| KR | 10-1240261 B1 | 3/2013 |
| KR | 10-2014-0066557 A | 6/2014 |
| WO | WO-2020019663 A1 * | 1/2020 |

OTHER PUBLICATIONS

European Search Report dated Jul. 17, 2020, issued in European Application No. 19215285.8-1203.

* cited by examiner

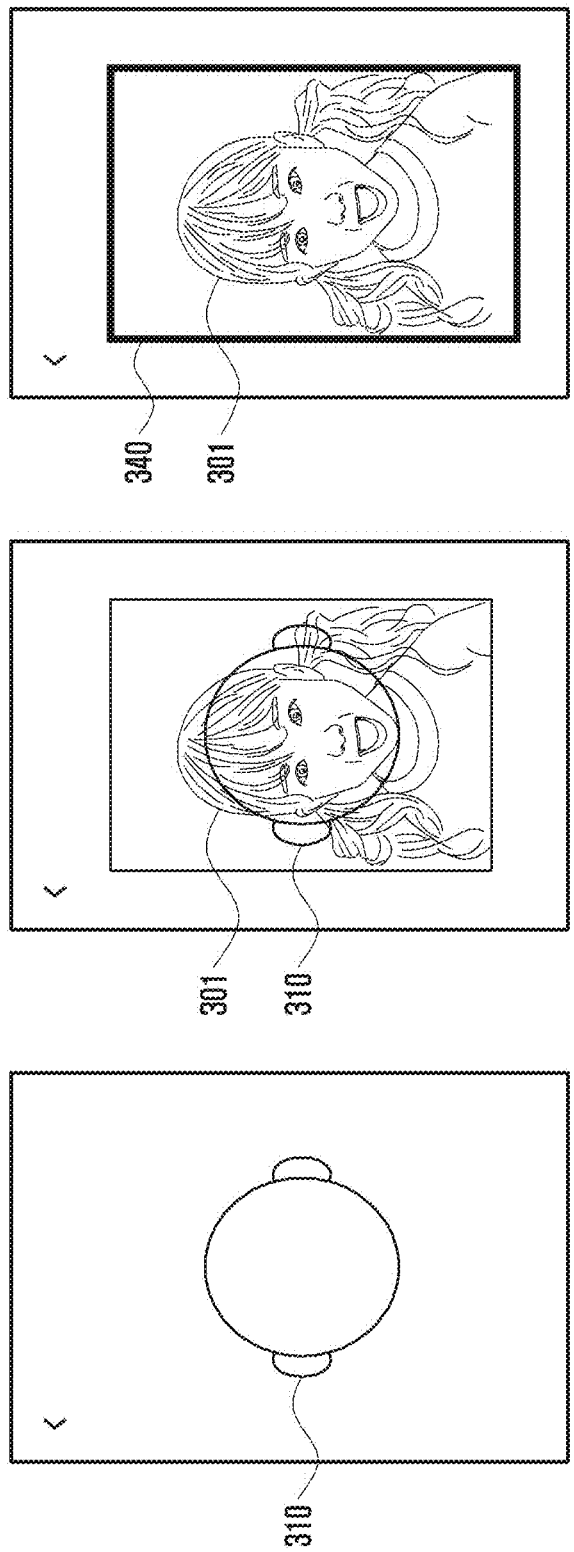

FIG. 6
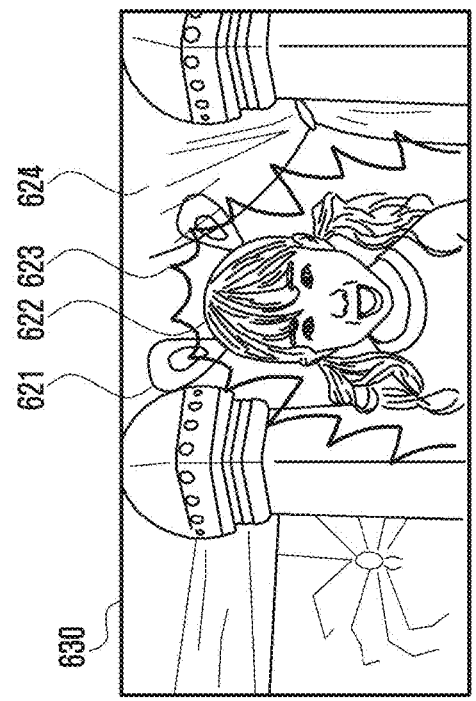
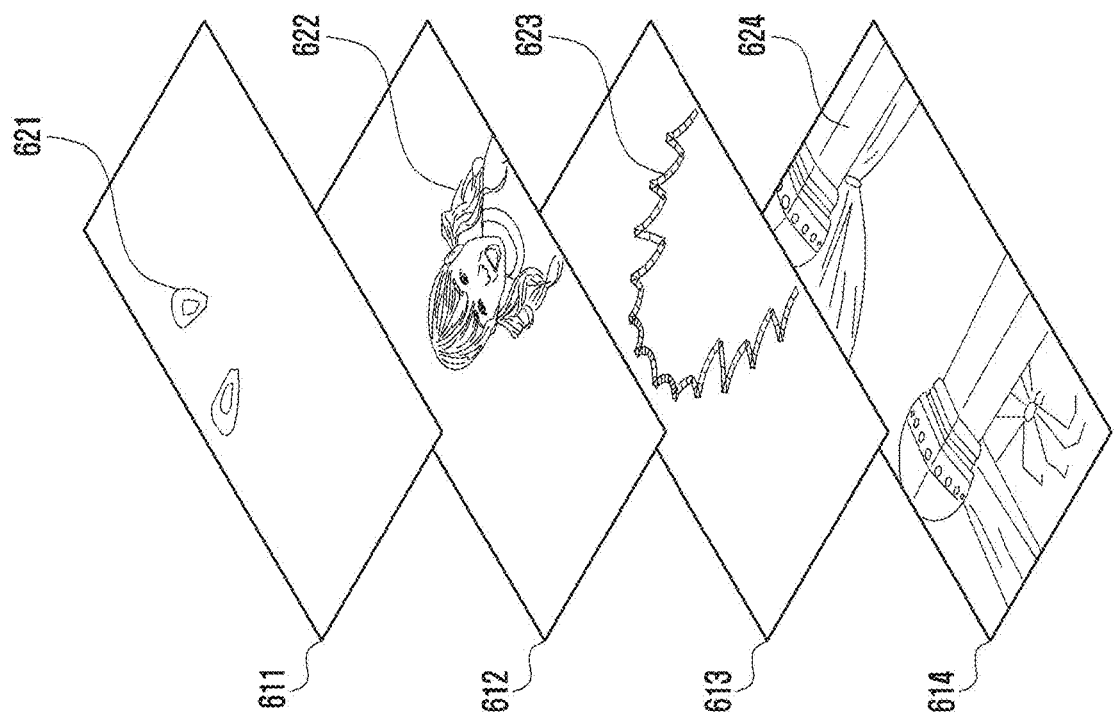

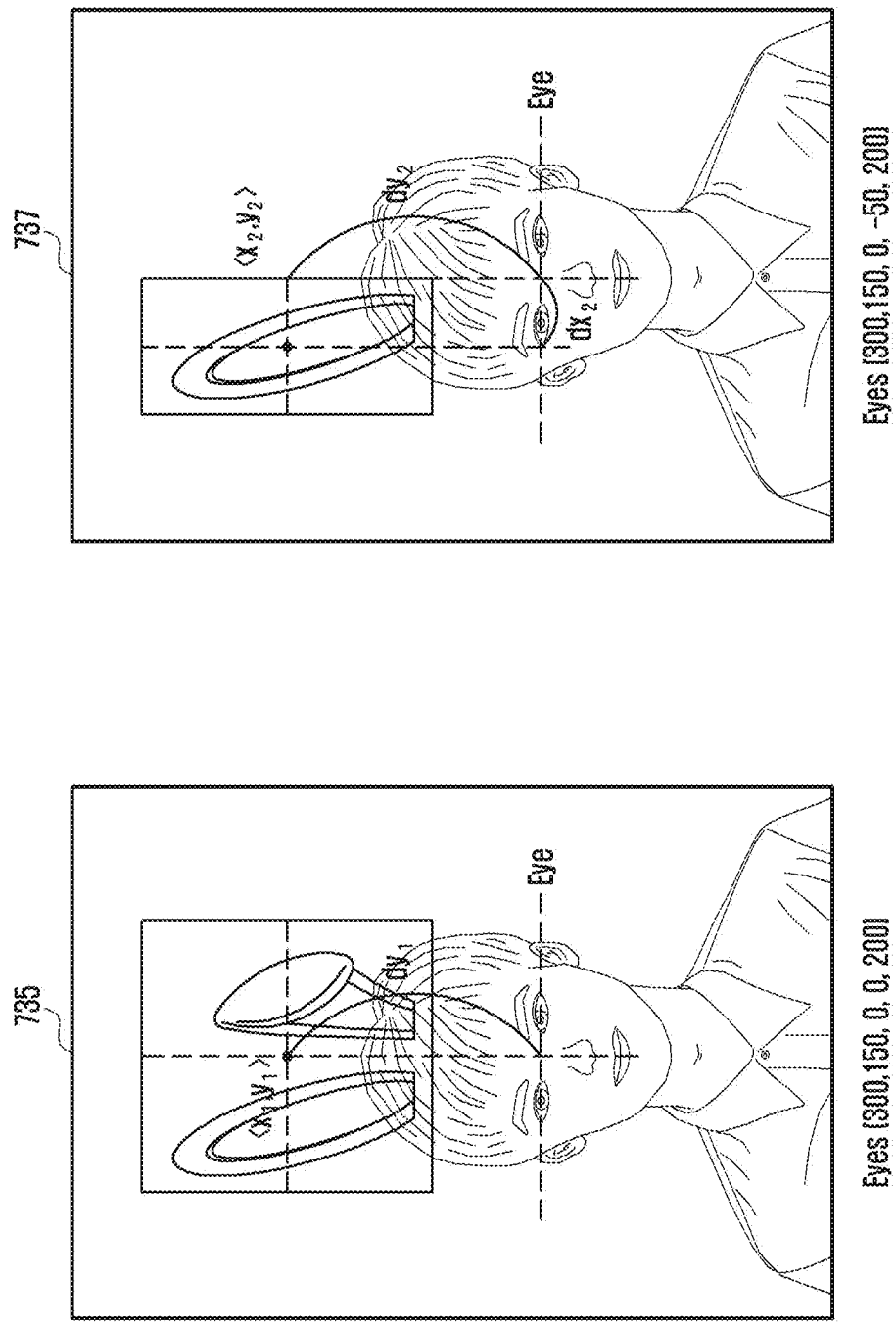

FIG. 8
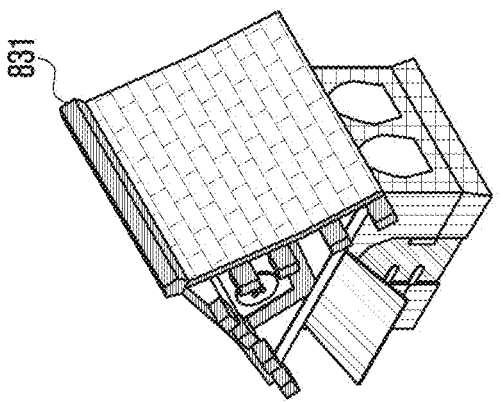
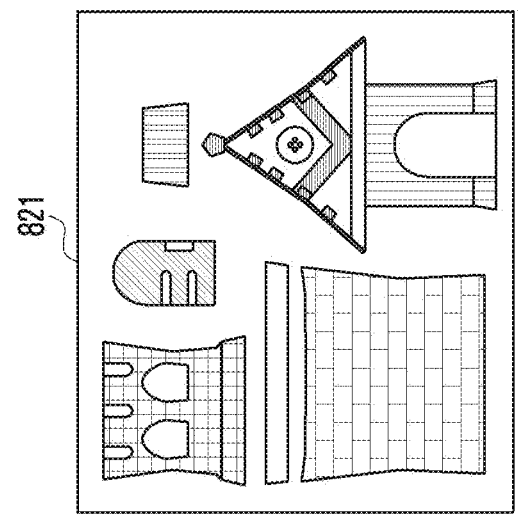
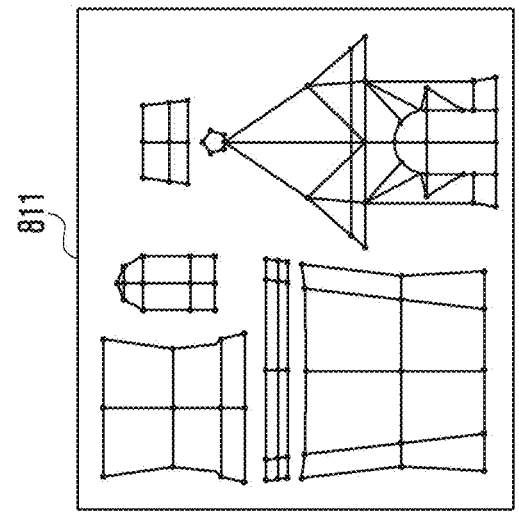

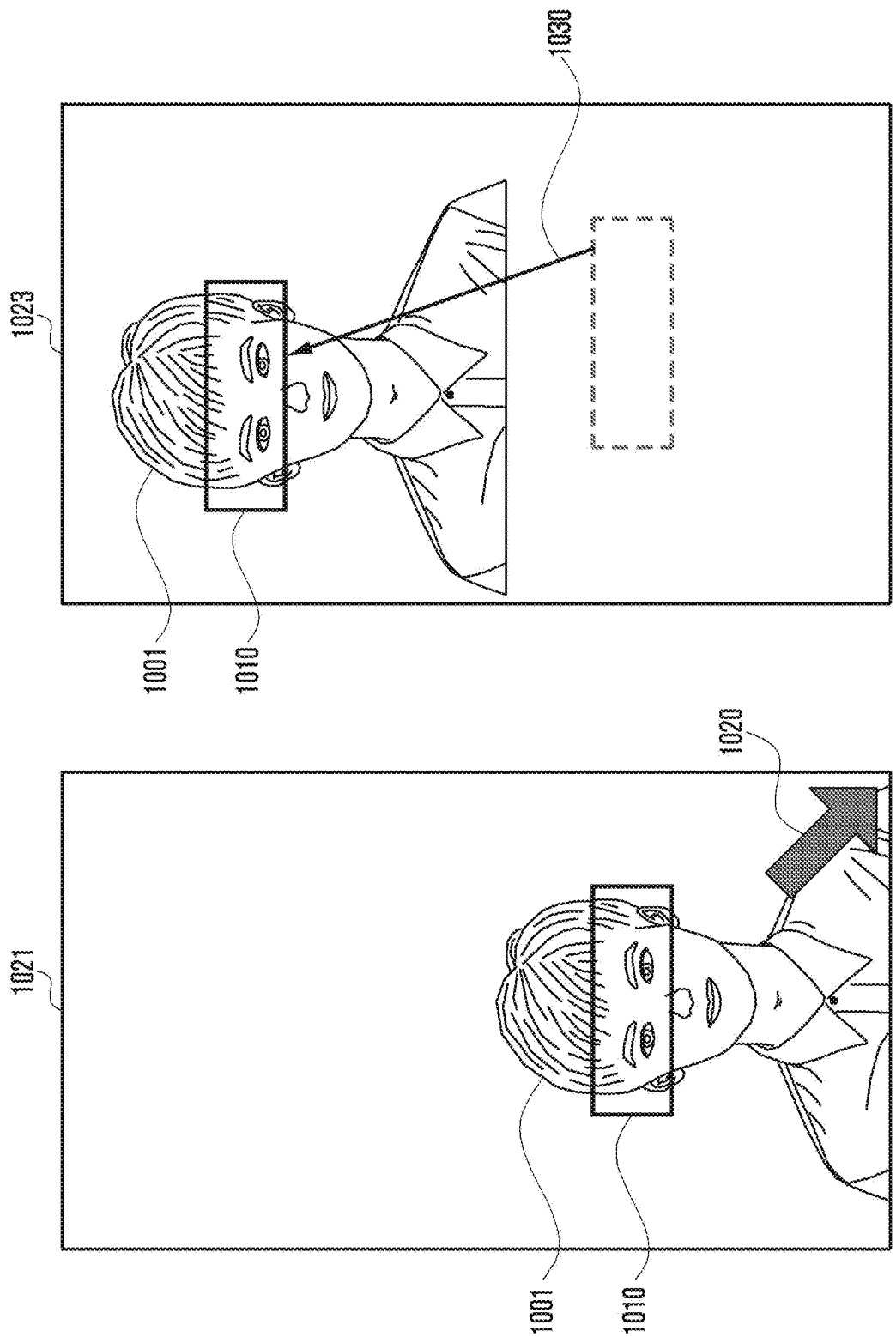

ELECTRONIC DEVICE AND CONTENT GENERATION METHOD

CROSS-REFERENCE TO RELATED APPLICATION(S)

This application is based on and claims priority under 35 U.S.C. § 119(a) of a Korean patent application number 10-2019-0024117, filed on Feb. 28, 2019, in the Korean Intellectual Property Office, the disclosure of which is incorporated by reference herein in its entirety.

BACKGROUND

1. Field

The disclosure relates to an electronic device and a method for generating content.

2. Description of Related Art

Various electronic devices including smartphones, tablet personal computers, portable multimedia players, personal digital assistants, laptop personal computers, and wearable devices such as wrist watches and head-mounted displays may provide a function for synthesizing content and images.

Although various types of content are provided by various applications, the user must use the content provided by content producers, and thus passive services are provided. For example, because content generation by the user of an electronic device is difficult, the content provided by the content producer is used in most cases.

To create a piece of content, it is often necessary to use a professional tool. In that case, the process may be complicated and fail to satisfy the user's production needs and diversity requirements.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and content generation method that can generate a piece of content through a simple input on an image including an object.

Another aspect of the disclosure is to provide an electronic device and content generation method that can easily synthesize a piece of content generated by the user into an image including an object.

Additional aspects will be set forth in part in the description which follows and, in part, will be apparent from the description, or may be learned by practice of the presented embodiments.

In accordance with an aspect of the disclosure, an electronic device is provided. The electronic device includes a display, a processor operatively connected to the display, and a memory operatively connected to the processor. The memory may store instructions that, when executed, cause the processor to obtain a first image including at least one object, detect a designated region in the first image by using the at least one object, display a guide indicating the designated region and a content generation tool on the display, receive a first user input through the display for generating or editing at least one content using the content generation tool, determine attribute information about the at least one content at least partially based on the designated region or the first user input, and store the determined attribute information and the at least one content in the memory.

In accordance with another aspect of the disclosure, a method for content generation is provided. The method includes obtaining a first image including at least one object, detecting a designated region in the first image by using the at least one object, displaying a guide indicating the designated region and a content generation tool on a display, receiving a first user input through the display for generating or editing at least one content using the content generation tool, determining attribute information about the at least one content at least partially based on the designated region or the first user input, and storing the determined attribute information and the at least one content.

According to various embodiments of the disclosure, the electronic device and content generation method may satisfy the user's production needs and diversity requirements.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 3 illustrates an example of obtaining an image in an electronic device according to an embodiment of the disclosure;

FIG. 6 illustrates an example of determining type information about content in an electronic device according to embodiment of the disclosure;

FIGS. 7A and 7B illustrate examples of determining position information about content in an electronic device according to various embodiments of the disclosure;

FIG. 8 illustrates an example of determining 3D model information about content in an electronic device according to an embodiment of the disclosure;

FIG. 10 illustrates an example of tracking feature points in an electronic device according to an embodiment of the disclosure;

Throughout the drawings, it should be noted that like reference numerals are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
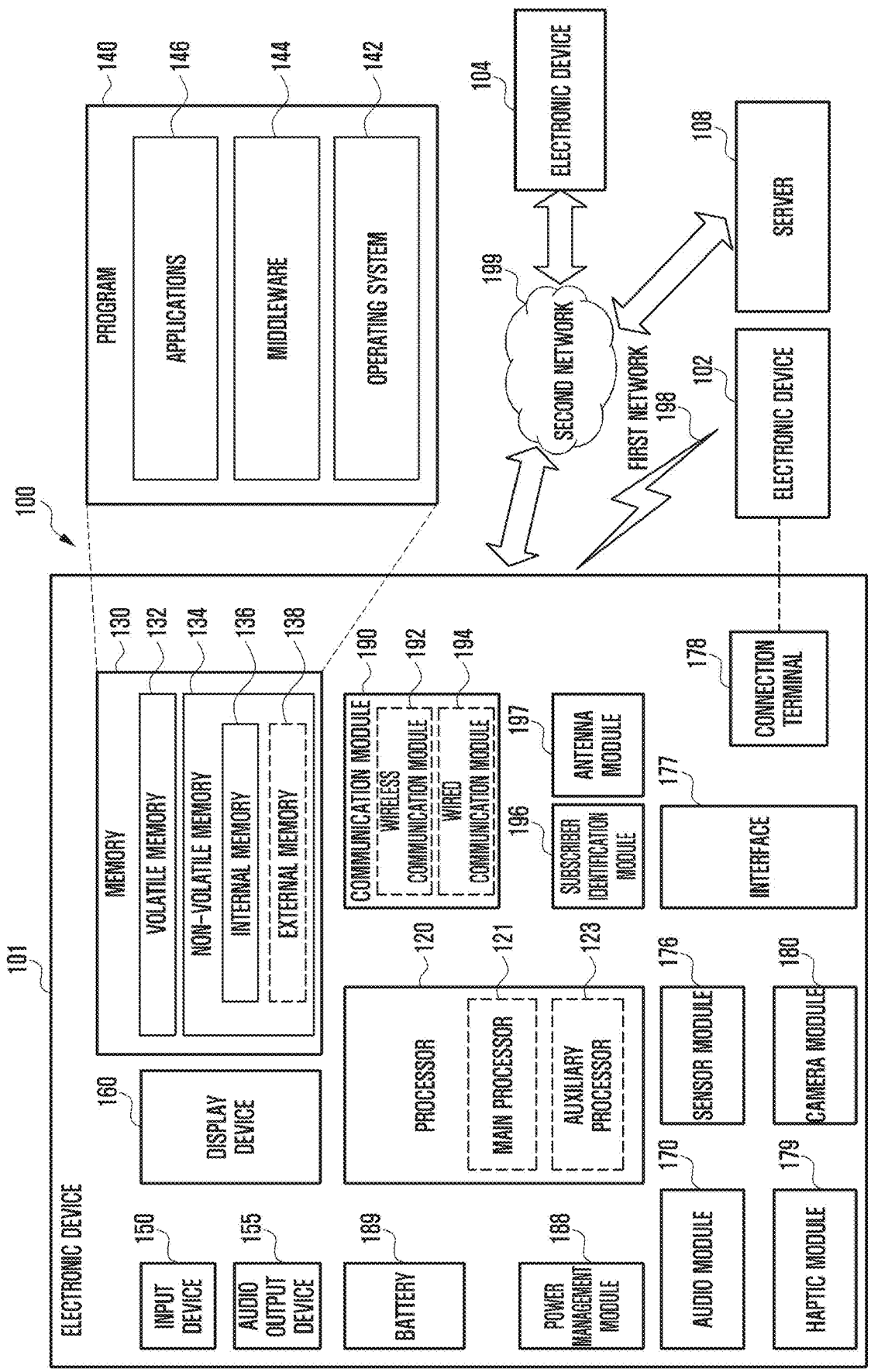
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
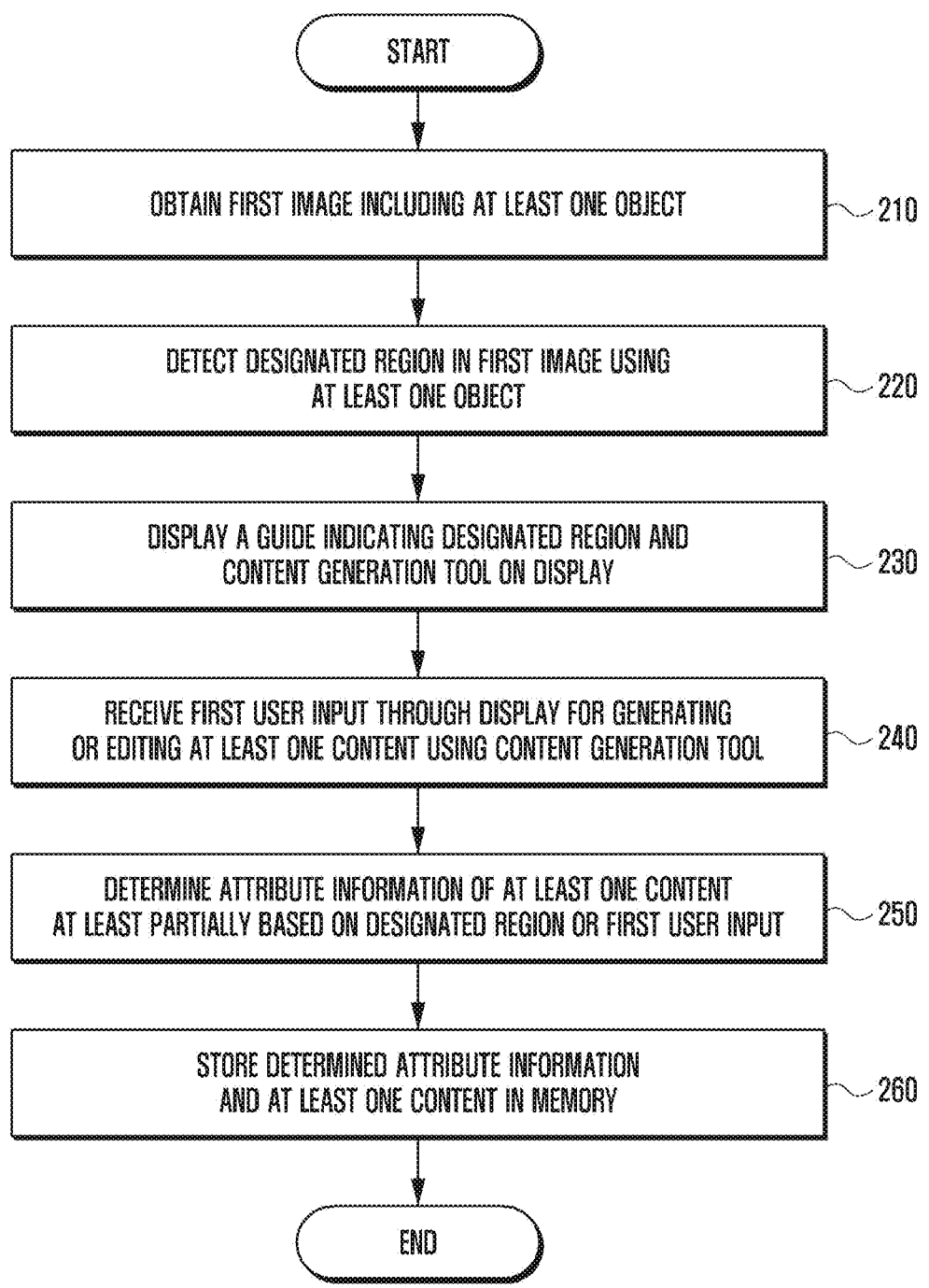
FIG. 2 is a flowchart of a content generation method for an electronic device according to an embodiment of the disclosure.

FIG. 2 is a flowchart of a content generation method for an electronic device according to an embodiment of the disclosure. Operations 210 to 260 of FIG. 2 will be described with reference to the configuration of the electronic device 101 shown in FIG. 1.

Referring to FIG. 2, in various embodiments, at operation 210, the processor 120 of the electronic device 101 may obtain a first image including at least one object. For example, the processor 120 may obtain an image including an object by using a camera module (e.g., camera module 180). As another example, the processor 120 may receive an image including an object from another electronic device (e.g., electronic device 102, electronic device 104, or server (e.g., server 108)) through a communication module (e.g., communication module 190). As another example, the processor 120 may obtain an image including an object by using template content stored in an application database.

In various embodiments, the processor 120 may provide a guide for obtaining the first image. The guide may vary depending on the object attribute. The object attribute may include, for example, at least one of a human face, a portion or entirety of a human body, an object, a background, etc. In an embodiment, the object attribute can be specified according to the selection of the user. For example, the processor 120 may receive a user input for selecting a user's face as an object attribute and provide a guide of a face shape to recognize the face of the user. Upon being provided with the guide, the user may move the position of the electronic device 101 or the camera so that an image of the user's face is located in the guide.

In various embodiments, the processor 120 may determine whether an object (e.g., face) is recognized according to the guide, and may automatically store an image including the object. In an embodiment, the processor 120 may notify the user that an object has been recognized according to the guide. In this case, the processor 120 may store the image according to a user input for image storage.

At operation 220, in various embodiments, the processor 120 of the electronic device 101 may detect a designated region in the first image by using at least one object.

In various embodiments, the processor 120 may identify at least one feature point included in the object and detect the designated region based on the at least one feature point. The feature points may include, for example, at least one of an eye, a nose, a mouth, an ear, a face shape, a neck, a hand, a torso, a shoulder, a foot, a finger, etc. In an embodiment, the processor 120 may identify at least one feature point among an eye, a nose, a mouth, an ear, and a face shape and detect a designated region (e.g., face region). In another embodiment, the processor 120 may identify at least one feature point among an eye, a nose, a mouth, an ear, a face shape, a shoulder, and a torso, and detect a designated region (e.g., upper body).

At operation 230, in various embodiments, the processor 120 of the electronic device 101 may display a guide indicating the designated region and a content generation tool on the display (e.g., display unit 160 in FIG. 1). For example, the processor 120 may display a guide representing a human face region in a canvas, and provide a content generation tool to allow the user to create or edit a piece of content in the canvas.

In various embodiments, the processor 120 may provide a canvas to which specific content is applied. For example, when the user requests editing of specific content, the canvas may be provided after the specific content is applied to the guide indicating the designated region.

In various embodiments, to support the content editing function, the processor 120 may provide a user with a content list including previously stored pieces of content. Upon receiving a user input for selecting specific content from the content list, the processor 120 may provide an image to which the selected content is applied. In response to a user input for editing the image, the processor 120 may display a guide indicating a designated region and a content generation tool. In this case, the selected content may have been applied to the guide indicating the designated region in the canvas.

In various embodiments, the processor 120 may provide a preview screen to which pre-stored content is applied according to a user input for browsing the content list. For example, upon receiving a user input for a preview screen, the processor 120 may apply specific content to the image and display the preview screen. In response to a user input for selecting content while the preview screen is output, the processor 120 may provide an image to which the selected content is applied. For example, in response to a user input for editing the preview screen, the processor 120 may display a guide indicating a designated region and a content generation tool. In this case, specific content may be applied to the guide indicating the designated region in the canvas.

In various embodiments, the processor 120 may provide a blank canvas. For example, when the user requests content creation, the processor 120 may display and provide only a guide indicating a designated region in the canvas.

At operation 240, in various embodiments, the processor 120 of the electronic device 101 may receive a first user input through the display (e.g., display unit 160 in FIG. 1) for creating and/or editing at least one content using the content generation tool.

In various embodiments, the content generation tool may provide a function for generating and/or editing content. For example, the user may use the content generation tool to enter drawing input on the display using a pen or part of the body. As another example, the user may change the color of the content or modify a portion of the content by using the content generation tool.

In various embodiments, the processor 120 may provide a canvas to which specific content is applied. In this case, the processor 120 may receive a user input for content and/or image editing, and edit specific content and/or image according to the user input. For example, the processor 120 may receive a user input for changing the color or modifying a portion of the content and/or the image displayed on the display, and edit the content accordingly. In an embodiment, the processor 120 may receive a user input of adding new content in the canvas to which specific content is applied, and may add new content accordingly.

In various embodiments, the processor 120 may provide a blank canvas. For example, the processor 120 may display only a guide indicating a designated region in the canvas. The user may use the content generation tool to generate content after entering a drawing input on the display through a pen or a part of the body. After generation of content, the processor 120 may receive a user input for changing the color or modifying a portion of the content and/or the image displayed on the display, and edit the content accordingly.

At operation 250, in various embodiments, the processor 120 of the electronic device 101 may determine attribute information about at least one content at least partially based on the designated region or the first user input. The attribute information may include, for example, at least one of type information, position information, relative size information, image data information, 3D model information, animation information, etc. about at least one piece of content.

In various embodiments, the processor 120 may divide the image into a plurality of layers based on depth information of the image. For example, the processor 120 may determine an object layer including the object based on depth information of the object, and determine a first layer above the object layer and a second layer below the object layer. The layer including the content may be placed as the first layer and/or the second layer.

As another example, the processor 120 may determine an object layer including an object and a background layer based on depth information of the object. The processor may determine a first layer disposed on top of the object layer or a second layer disposed between the object layer and the background layer, and may arrange the layer including the content as the first layer and/or the second layer. When the location of the layer including the content is determined, the processor 120 may determine this as type information, and the determined type information may be stored as the attribute information or a portion thereof.

In various embodiments, the processor 120 may determine position information (or, anchor information) for at least one content at least partially based on at least one feature point, and may store the determined position information as the attribute information or a portion thereof. For example, the processor 120 may select a feature point related to the content, and determine the relative position of the content with respect to the feature point as position information. More specifically, when it is determined that the content includes the human eye region or is located around the eye region, the processor 120 may determine the position of the content with respect to the eye region. In an embodiment, the processor 120 may store the position information of the content in an anchor coordinate system (e.g., {feature, x, y, z} or {feature, x, y, z, dx, dy}).

In various embodiments, the processor 120 may determine the relative size information of at least one content with respect to the designated region, and store the determined relative size information as the attribute information or a portion thereof. For example, the processor 120 may store the relative size of the content as a ratio with respect to the designated region.

In various embodiments, the processor 120 may determine the image data information and store the determined image data information as the attribute information or a portion thereof. The image data information may include, for example, color format information such as RGBA, YCbCr, or CMYK, and image path information such as a URL.

In various embodiments, the processor 120 may determine 3D model information and store the determined 3D model information as the attribute information or a portion thereof. The 3D model information may include, for example, at least one of vertex information, normal information, UV information, etc. The vertex information may include, for example, three-dimensional vertex coordinates of an object. The normal information may include, for example, three-dimensional bending information of a surface generated based on the vertex information. The UV information may include, for example, mapping information necessary for texturing the surface of a three-dimensional model.

In various embodiments, the processor 120 may determine animation information and store the determined animation information as the attribute information or a portion thereof. The animation information may include, for example, information related to glitter, motion (e.g., up, down, left, right), or shake in the case of two-dimensional content, and may include, for example, information related to the position of each joint in the case of three-dimensional content.

At operation 260, in various embodiments, the processor 120 of the electronic device 101 may store the determined attribute information and at least one content in the memory.

In various embodiments, the content may be stored by cropping the entire canvas or the region occupied by the content. The attribute information may be associated with at least one content, and may be stored as metadata of at least one content or as separate independent data.

FIG. 3 illustrates an example of obtaining an image in an electronic device according to an embodiment of the disclosure.

In various embodiments, the processor 120 may provide a guide for obtaining a first image. The guide may vary depending on the object attribute. The object attribute may include, for example, at least one of a human face, a portion or whole of a human body, an object, a background, etc. In an embodiment, the object attribute can be specified according to the selection of the user.

Referring to FIG. 3, the processor 120 may provide a guide 310 of a face shape to recognize the face of the user. In an embodiment, the processor 120 may provide the guide 310 in response to a user input for selecting a human face as the object attribute. Upon being provided with the guide 310, the user may move the position of the electronic device 101 or the camera such that an image of the user's face is located in the guide 310.

In various embodiments, the processor 120 may determine whether an object 301 (e.g., face) is recognized according to the guide 310, and automatically store an image including the object 301. For example, the processor 120 may determine whether at least one feature point (e.g., eye, nose, mouth, ear, face, etc.) is detected in the guide 310 and store the corresponding image.

In an embodiment, the processor 120 may notify the user that an object 301 is recognized according to the guide 310. In this case, the processor 120 may store the corresponding image in response to a user input for requesting image storage.

In various embodiments, the processor 120 of the electronic device 101 may obtain the first image 340 including at least one object 301.

Figure 4A:
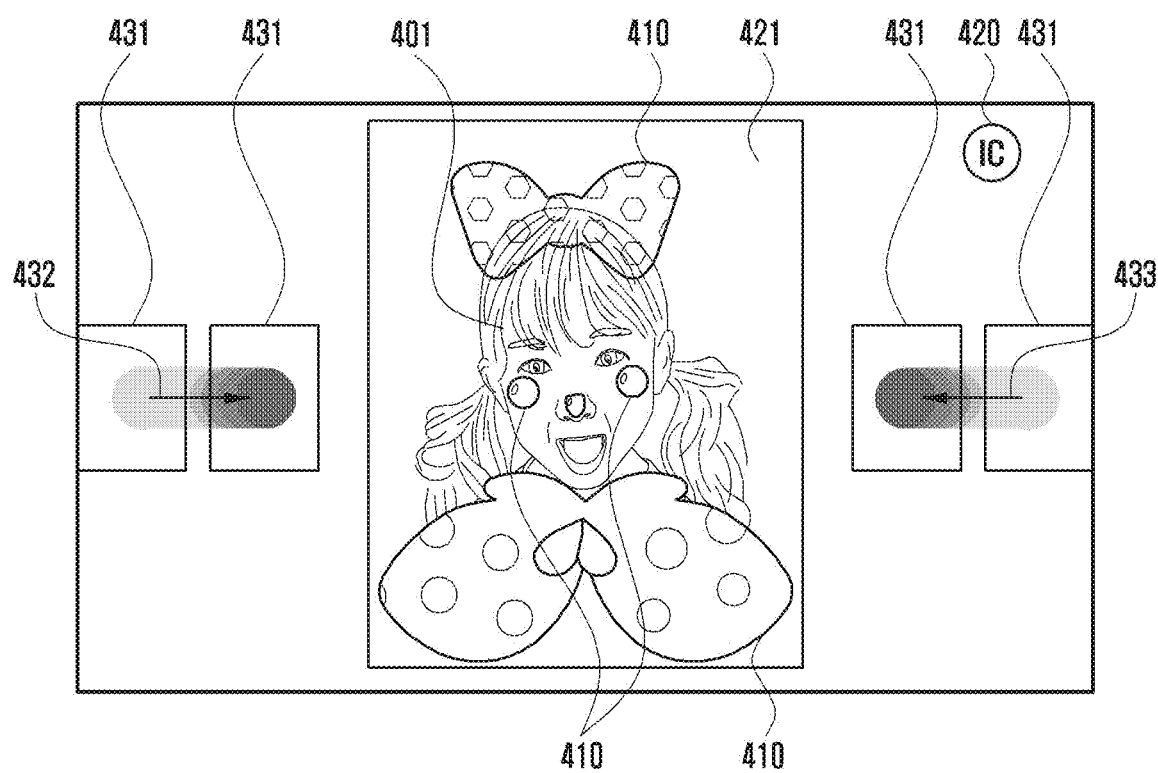
FIGS. 4A and 4B illustrate examples of generating content in an electronic device according to various embodiments of the disclosure.
Figure 4B:
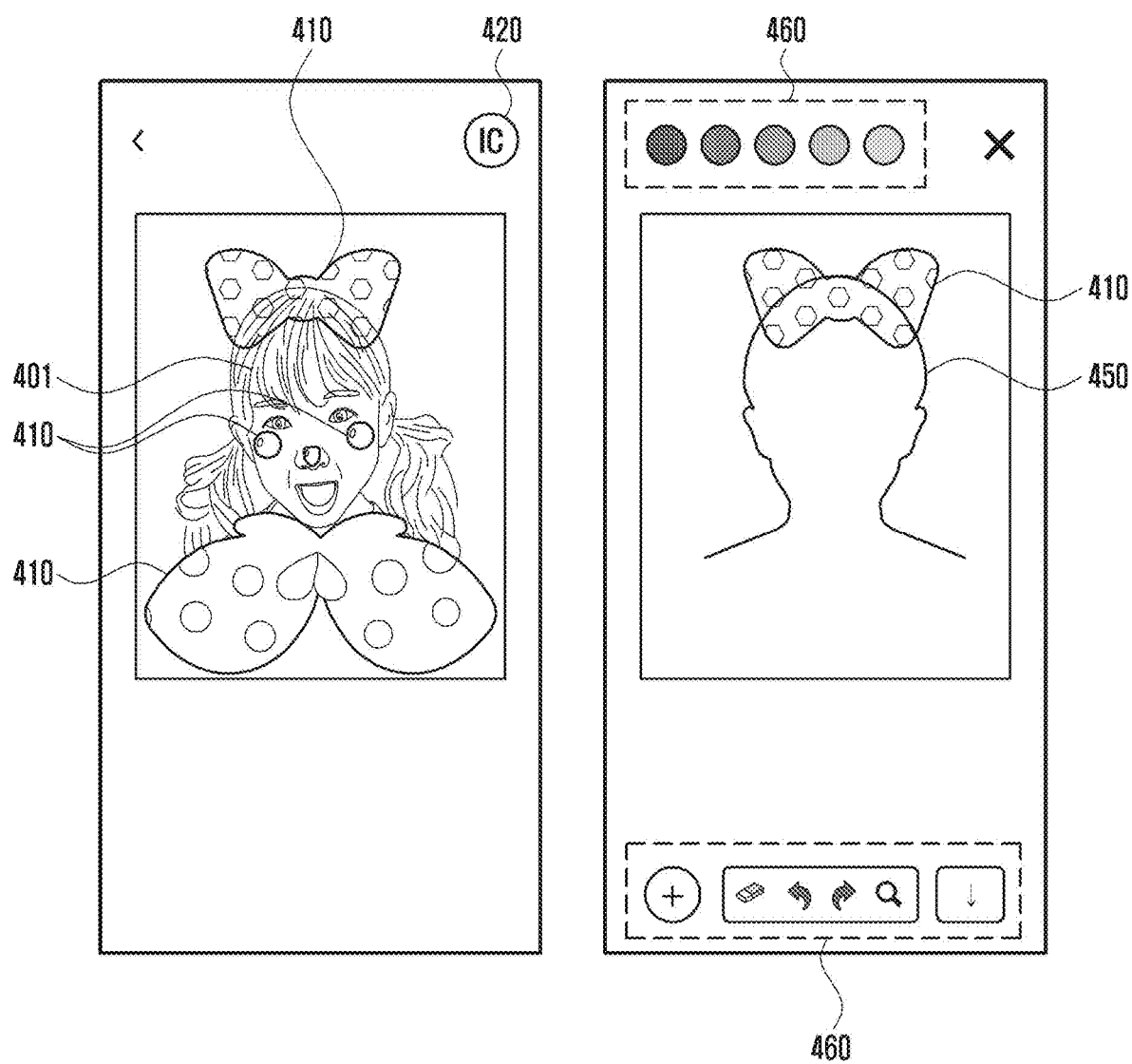

FIGS. 4A and 4B illustrate examples of generating content in an electronic device according to various embodiments of the disclosure.

Referring to FIG. 4A, an example is illustrated in which the electronic device 101 provides a canvas to which specific content is applied. In response to a user request for content editing, the processor 120 may provide the user with a content list 431 including stored pieces of content to support a content editing function. In various embodiments, the processor 120 may provide a preview screen 421 to which previously stored content is applied according to a user input for browsing the content list 431. For example, when receiving a user input for browsing the content list 431 (e.g., right drag 432 or left drag 433), the processor 120 may provide the preview screen 421 by applying selected content 410 to the image including the object 401.

In various embodiments, in response to a user input for editing the content 410 displayed on the preview screen 421, the processor 120 may display a guide indicating the designated region and a content generation tool. For example, the processor 120 may display a guide indicating the designated region and a content generation tool in response to a user input for selecting a content editing item 420.

Referring to FIG. 4B, another example is illustrated in which the electronic device 101 provides a canvas to which specific content 410 is applied. For example, the processor 120 may identify the designated region by using an object 401, apply the specific content 410 to the guide 450 indicating the designated region, and provide the canvas.

In various embodiments, the processor 120 may receive a first user input of generating or editing at least one content using a content generation tool 460. For example, the processor 120 may receive a user input for changing the color or shape of the content 410 and/or the image displayed on the display, and edit and/or generate the content 410.

Figure 5:
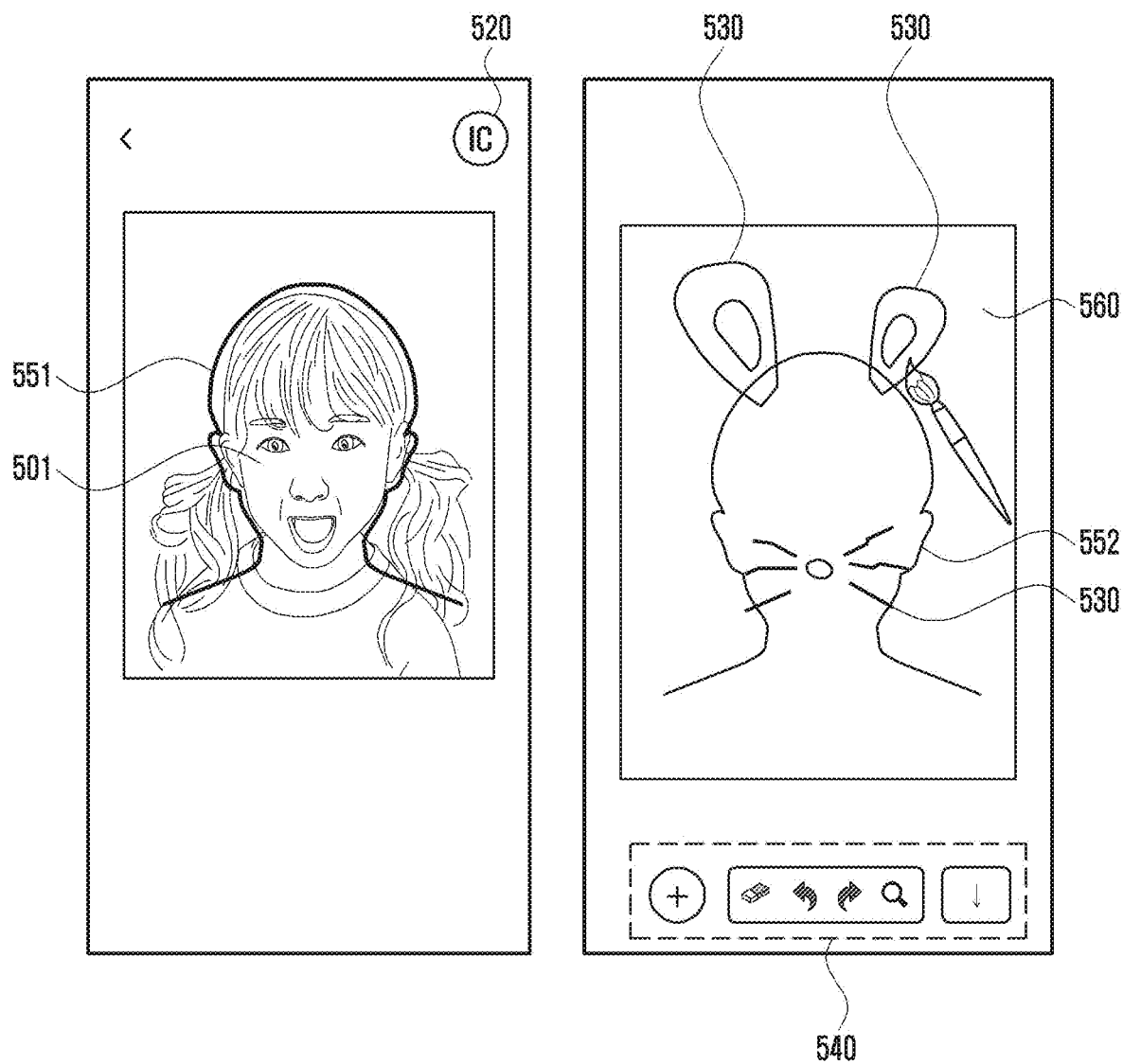
FIG. 5 illustrates an example of generating content in an electronic device according to an embodiment of the disclosure.

FIG. 5 illustrates an example of generating content in an electronic device according to an embodiment of the disclosure.

Referring to FIG. 5, a blank canvas 560 is shown. In various embodiments, the processor 120 may identify a designated region 551 based on an object 501, and display a guide 552 representing the designated region 551 in the blank canvas 560.

In various embodiments, the processor 120 may display a guide indicating a designated region and a content generation tool in response to a user input for content generation. For example, in response to a user input for selecting the content editing item 520, the processor 120 may display the guide 552 indicating the designated region and a content generation tool 540.

In various embodiments, the processor 120 may receive a first user input to generate at least one content 530 using the content generation tool 540. The user may use the content generation tool 540 to generate a piece of content 530 by entering a drawing input on the display using a pen or a part of the body. After generation of the content 530, the processor 120 may receive a user input for changing the color or shape of the content 530 and/or the image displayed on the display and edit the content 530 accordingly.

FIG. 6 illustrates an example of determining type information about content in an electronic device according to an embodiment of the disclosure.

In various embodiments, the processor 120 may divide an image into a plurality of layers based on depth information of the image. For example, the processor 120 may determine an object layer including an object and a background layer based on depth information of the object. The processor 120 may determine a first layer on top of the object layer and a second layer between the object layer and the background layer, and may place the layer including content as the first layer and/or the second layer.

Referring to FIG. 6, an image divided into four layers 611, 612, 613, and 614 is shown. The image may be divided into an object layer 612 including an object 622 and a background layer 614 including background 624 except for the object 622. The layer including the content 621 or 623 may be disposed as the first layer 611 and/or the second layer 613. The processor 120 may synthesize an image based on depth information of individual layers. For example, the processor 120 may form an image 630 by stacking the first layer 611 as the uppermost layer, the object layer 612, the second layer 613, and the background layer 614 in sequence.

Figure 7A:
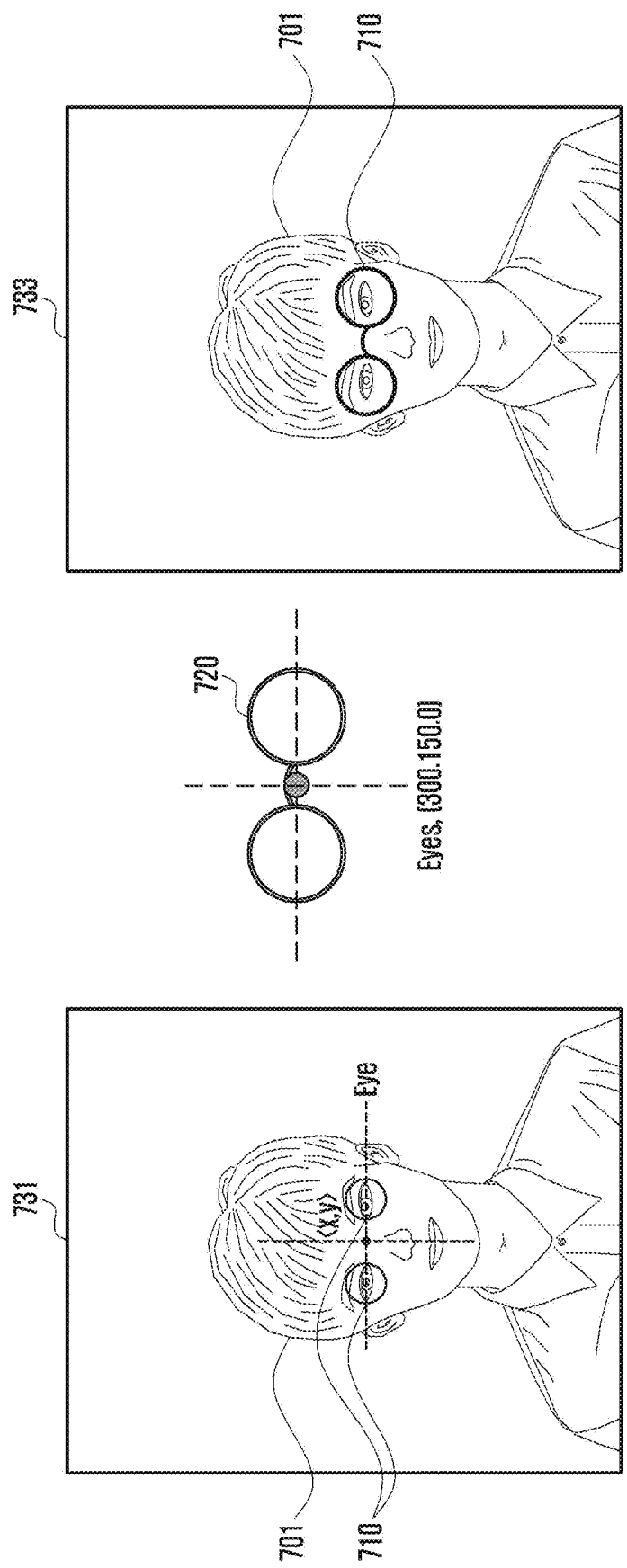

FIGS. 7A and 7B illustrate examples of determining position information about content in an electronic device according to various embodiments of the disclosure.

In various embodiments, the processor 120 may determine position information (or, anchor information) for the at least one content at least partially based on at least one feature point, and store the determined position information as the attribute information or a portion thereof. For example, the processor 120 may select a feature point related to the content, and determine the relative position of the content with respect to the feature point as position information.

Referring to FIG. 7A, a case is illustrated in which the feature point is inside the region occupied by content. In various embodiments, the processor 120 may identify at least one feature point included in an object 701 and determine position information of the content based on the at least one feature point. For example, the processor may determine coordinates (x, y) of eyes 710 in an image 731 including the object 701.

When the eyes 710 are included in the region occupied by the content 720 generated by the user, the processor 120 may determine the anchor coordinates (e.g., {feature, x, y, z}) of the content 720 based on the coordinates (x, y) of the eyes. For example, if the eye coordinates are (300, 150) and the content 720 is placed on the first layer (depth=0), the anchor coordinates of the content may be determined as {Eyes, (300, 150, 0)}.

In various embodiments, the processor 120 may obtain a synthesized image 733 by synthesizing the content 720 using the position information of the content 720. Although not shown, even when an image including another object is obtained, the processor 120 may detect a feature point (e.g., eye) in the image and synthesize the content 720 to obtain a synthesized image 733.

Referring to FIG. 7B, a case is illustrated in which the feature point is outside the region occupied by content. In various embodiments, the processor 120 may identify at least one feature point closest to the content and determine position information of the content based on the at least one feature point.

For example, in an image 735, the processor 120 may identify the coordinates (x, y) of the eyes, which are feature points closest to the content, and determine the anchor coordinates of the content (e.g., {feature, x, y, z, dx, dy}) based on the eye coordinates (x, y). For example, if the eye coordinates are (300, 150), the content is placed on the first layer (depth=0), and the position of the content is shifted by 200 on the y axis compared to the eyes, the anchor coordinates of the content may be determined to be {Eyes, (300, 150, 0, 0, 200)}.

For example, in an image 737, the processor 120 may identify the coordinates (x, y) of the eyes, which are feature points closest to the content, and determine the anchor coordinates of the content (e.g., {feature, x, y, z, dx, dy}) based on the eye coordinates (x, y). For example, if the eye coordinates are (300, 150), the content is placed on the first layer (depth=0), and the position of the content is shifted by −50 on the x axis and by 200 on the y axis compared to the eyes, the anchor coordinates of the content may be determined to be {Eyes, (300, 150, 0, −50, 200)}.

FIG. 8 illustrates an example of determining 3D model information about content in an electronic device according to an embodiment of the disclosure.

In various embodiments, the processor 120 may determine 3D model information and store the determined 3D model information as the attribute information or a portion thereof. The 3D model information may include, for example, at least one of vertex information, normal information, UV information, etc. The vertex information may include, for example, three-dimensional vertex coordinates of an object. The normal information may include, for example, three-dimensional bending information of a surface generated based on the vertex information. The UV information may include, for example, mapping information necessary for texturing the surface of a three-dimensional model.

Referring to FIG. 8, an example is illustrated of content 831 implemented in three dimensions based on three-dimensional model information. For example, a vertex map 811 may separate faces forming an object and include coordinates of vertices of the faces in the three-dimensional plane. A UV map 821 may include texture information of each face formed by the object. Although not shown, information about the bending of each face may be included in the normal information. In various embodiments, the processor 120 may perform three-dimensional modeling of the content 831 using at least one of vertex information, normal information, or UV information.

Figure 9:
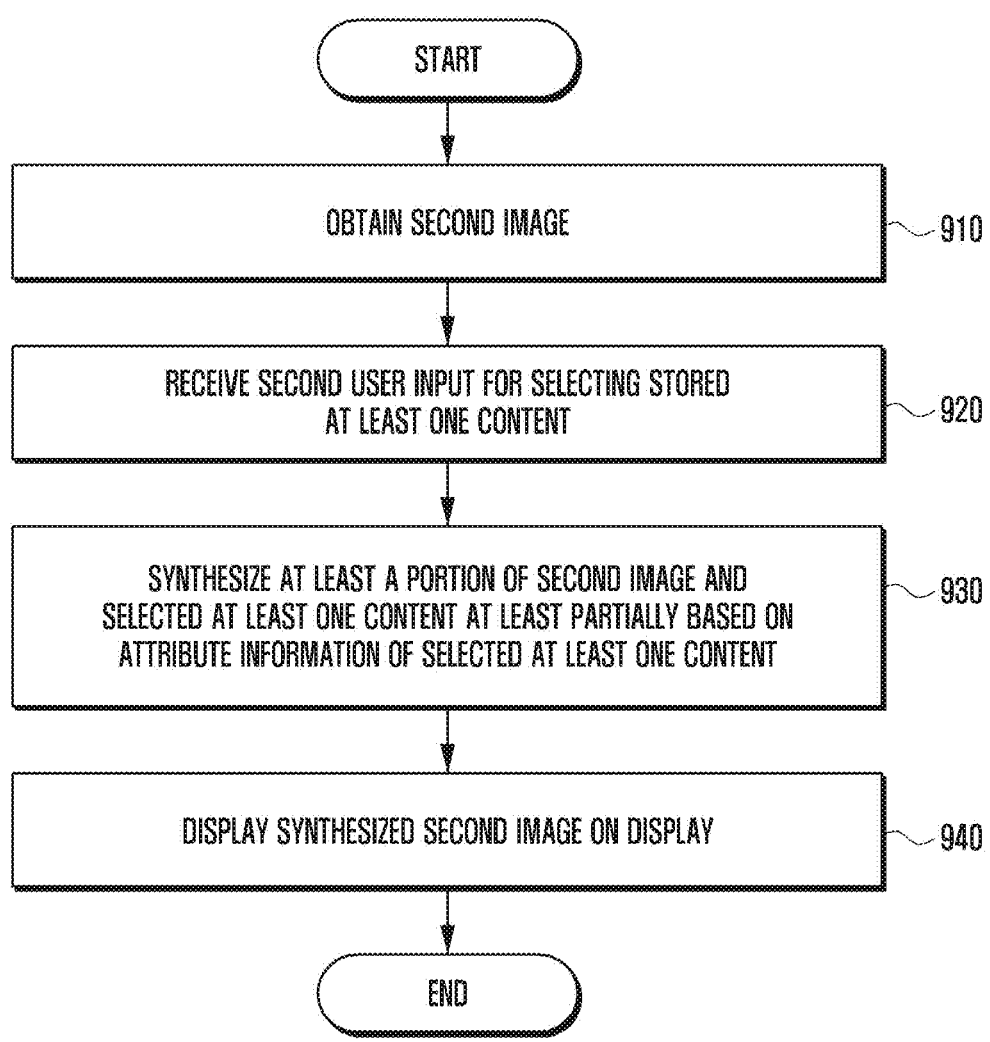
FIG. 9 is a flowchart of a method for displaying a synthesized image in an electronic device according to an embodiment of the disclosure.

FIG. 9 is a flowchart of a method for displaying a synthesized image in an electronic device according to an embodiment of the disclosure. Operations 910 to 940 in FIG. 9 will be described with reference to the configuration of the electronic device 101 of FIG. 1. In an embodiment, after operation 260 in FIG. 2, the electronic device 101 may perform the operations of FIG. 9.

Referring to FIG. 9, at operation 910, in various embodiments, the processor 120 of the electronic device 101 may obtain a second image including an object. For example, the processor 120 may obtain an image including an object by using a camera module (e.g., camera module 180). As another example, the processor 120 may receive an image including an object from another electronic device (e.g., electronic device 102, electronic device 104, or server (e.g., server 108)) through a communication module (e.g., communication module 190). As another example, the processor 120 may obtain an image including an object by using template content stored in an application database.

In various embodiments, the object of the second image may be the same as or different from the at least one object included in the first image of FIG. 2. For example, the second image may be the same as or different from the first image.

At operation 920, in various embodiments, the processor 120 of the electronic device 101 may receive a second user input for selecting at least one stored content.

In various embodiments, the processor 120 may provide the user with a content list including stored pieces of contents. The user may select content generated by the user or select template content provided by the application through the content list.

In various embodiments, the processor 120 may provide a preview screen to which pre-stored content is applied in response to a user input for browsing the content list. For example, the processor 120 may receive a user input for a preview screen, apply specific content to an image, and provide a preview screen.

At operation 930, in various embodiments, the processor 120 of the electronic device 101 may synthesize at least a portion of the second image and at least one selected content at least partially based on the attribute information included in the at least one selected content. The attribute information may include, for example, at least one of type information, position information, relative size information, image data information, 3D model information, animation information, etc. about at least one piece of content.

In various embodiments, the processor 120 may detect a designated region in the second image by using the object included in the second image. For example, the processor 120 may identify at least one feature point included in the object and detect the designated region based on the at least one feature point. In various embodiments, the processor 120 may synthesize the content into the image at least partially based on the designated region. For example, the processor 120 may adjust the size of the content or determine the position of the content by using the designated region.

In various embodiments, the processor 120 may modify the content based on the feature point included in the second image. For example, the processor 120 may modify the size and/or ratio of the content based on the distance and/or ratio between the feature points.

At operation 940, in various embodiments, the processor 120 of the electronic device 101 may control the display (e.g., display unit 160 in FIG. 1) to display the synthesized second image.

In various embodiments, the second image may be a still image or a moving image. For example, when the second image is a moving image, the object included in the second image may move. In an embodiment, the second image may be a preview image obtained through the camera module. In this case, the preview image may be processed in a similar manner to a moving image.

In various embodiments, when the second image is a moving image, the processor 120 may continuously control the content based on the attribute information of the content. For example, the processor 120 may control the content being displayed based on at least one of the 3D model information or the animation information.

In various embodiments, when the second image is a moving image, the processor 120 may check the state of the electronic device 101 by using an acceleration sensor or an optical flow of the second image, and may estimate the motion of the object based on the state of the electronic device 101. The processor 120 may track the feature point based on the motion of the object. In various embodiments, the processor 120 may move at least one displayed content based on the motion of the object. For example, if the state of the electronic device 101 indicates a movement to the lower right, the processor 120 may predict that the object on the screen will move to the upper left. The processor 120 may control the movement direction and/or the movement speed of the content being displayed on the basis of the movement direction and/or the movement speed of the electronic device 101.

In various embodiments, when the second image is a moving image, the processor 120 may modify the content based on the movement of the feature point. For example, the processor 120 may continuously modify the size and/or ratio of the content based on the movement distance of each feature point and/or a change in the ratio between the feature points.

FIG. 10 illustrates an example of tracking feature points in an electronic device according to an embodiment of the disclosure.

In various embodiments, the processor 120 may check the state of the electronic device 101 by using an acceleration sensor and/or an optical flow of the second image, and may estimate the movement of the object based on the state of the electronic device 101. The processor 120 may track the feature point based on the movement of the object. A method for tracking feature points according to various embodiments of the disclosure can reduce the workload compared to a case of searching for a feature point continuously over the entire region of the image.

Referring to FIG. 10, while an image 1021 is being displayed, the processor 120 may identify the state of the electronic device 101 moving to a lower right portion 1020. The processor 120 may predict that an object 1001 on the screen will move to an upper left portion 1030 based on the state of the electronic device 101. The processor 120 may track a feature point 1010 based on the movement of the object 1001. In an embodiment, the processor 120 may control the movement direction and/or the movement speed of the content to be displayed on an image 1023 on the basis of the movement direction and/or the movement speed of the electronic device 101.

Figure 11A:
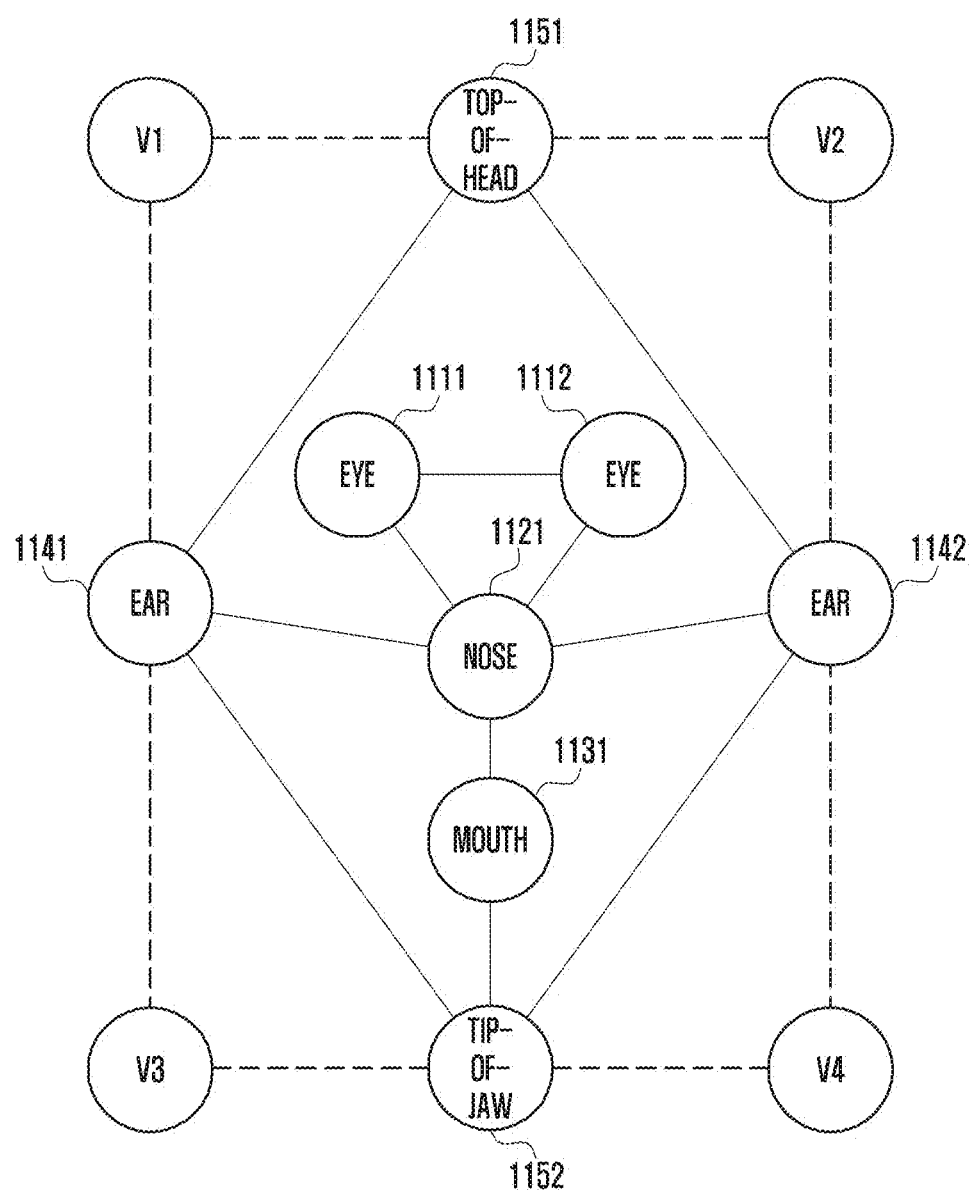
FIGS. 11A, 11B, and 11C illustrate examples of controlling display of content in an electronic device according to various embodiments of the disclosure.
Figure 11B:
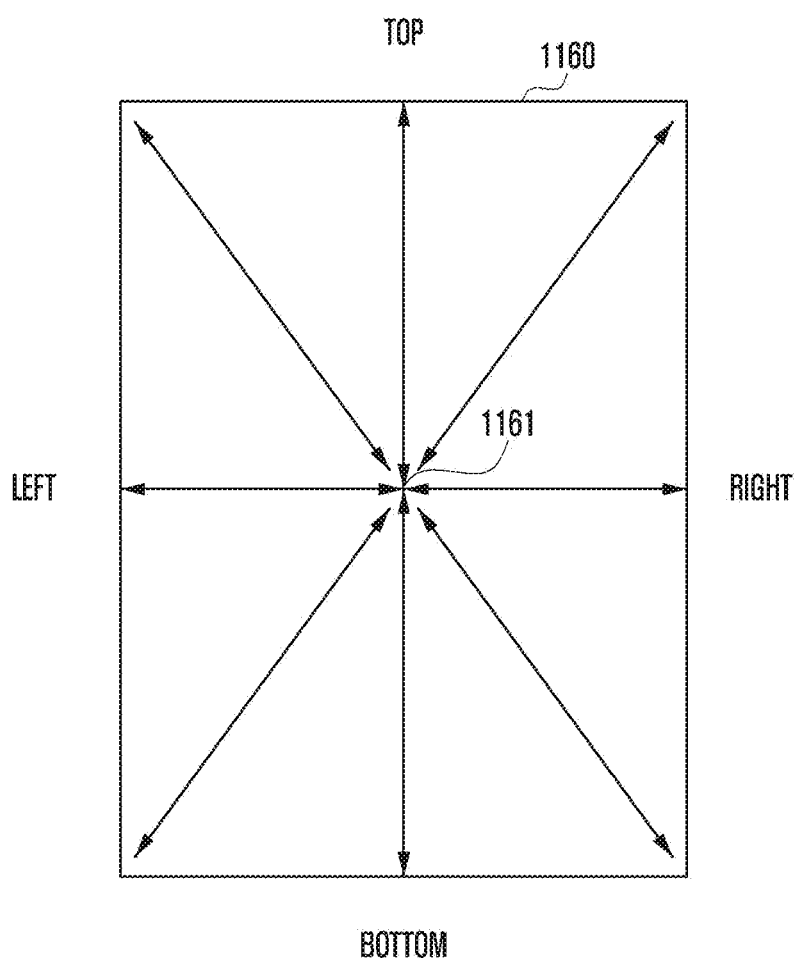
Figure 11C:
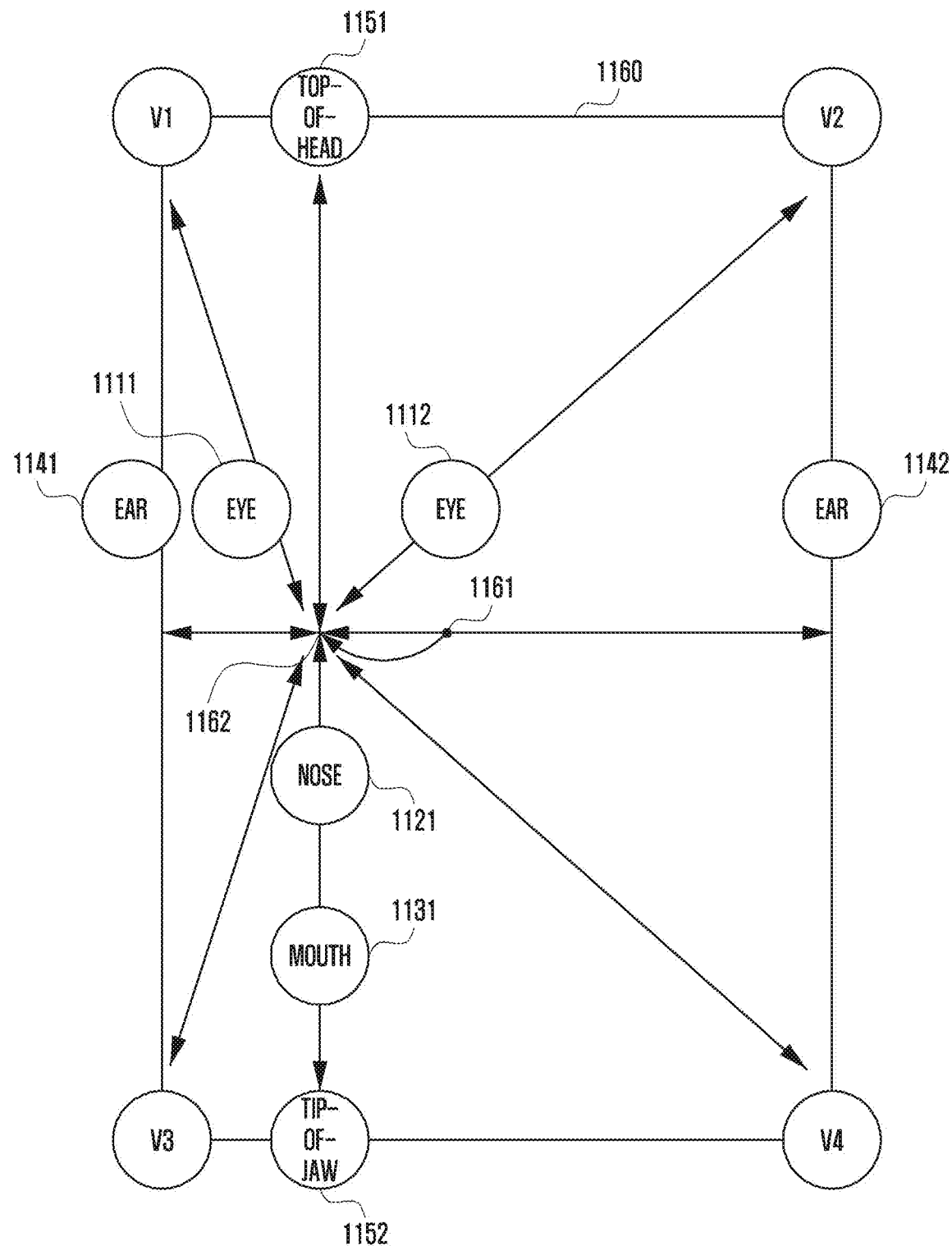

FIGS. 11A, 11B, and 11C illustrate examples of controlling display of content in an electronic device according to various embodiments of the disclosure.

In various embodiments, the processor 120 may identify at least one feature point included in the object and may modify the content based on the at least one feature point. For example, the processor 120 may modify the size and/or ratio of the content based on the distance and/or ratio between the feature points.

Referring to FIG. 11A, a feature map representing the distance and/or ratio between feature points is illustrated. In various embodiments, the processor 120 may identify at least one feature point included in the object and obtain a feature map. For example, the processor 120 may identify an eye 1111, an eye 1112, a nose 1121, a mouth 1131, an ear 1141, an ear 1142, a top-of-head 1151, or a tip-of-jaw 1152 included in the image, and may obtain a feature map according to the distance and/or ratio between the feature points. In an embodiment, the boundary line formed by the feature points (e.g., V1-V2-V3-V4) may be recognized as a face region. For example, the feature map illustrated in FIG. 11A may represent the face of a person looking straight ahead.

Referring to FIG. 11B, a method of adjusting the size and/or ratio of content is illustrated.

In various embodiments, the size and/or ratio of content 1160 may be adjusted in various ways. For example, the processor 120 may move the position of a reference point 1161 based on the feature points, and adjust the size and/or ratio according to the moved reference point 1161. In an embodiment, the reference point 1161 may be moved in any of four directions, eight directions, or sixteen directions. In a certain embodiment, the content 1160 may include a plurality of reference points 1161, and each reference point 1161 may be moved with respect to the corresponding feature point.

Referring to FIG. 11C, an example of synthesizing content into an image is illustrated.

In various embodiments, the processor 120 may identify at least one feature point included in the object and obtain a feature map. For example, the processor 120 may identify an eye 1111, an eye 1112, a nose 1121, a mouth 1131, an ear 1141, an ear 1142, a top-of-head 1151, or a tip-of-jaw 1152 included in the image, and may obtain a feature map according to the distance and/or ratio between the feature points. The feature map illustrated in FIG. 11C may represent a case where the face of the person obtained in FIG. 11A is rotated to the right.

In various embodiments, the processor 120 may move the position of a reference point 1161 based on movement of the feature points. For example, the reference point 1161 may be moved and become a reference point 1162, and the size and/or ratio of the content 1160 may be adjusted according to the new reference point 1162. In various embodiments, the processor 120 may synthesize the content 1160 to the identified facial region (e.g., V1-V2-V3-V4) based on the feature points.

In various embodiments, when the second image is a moving image, the processor 120 may modify the content 1160 based on the movement of the feature points. For example, the processor 120 may continuously modify the size and/or ratio of the content 1160 based on the movement distance of each feature point and/or a change in the ratio between the feature points.

Figure 12A:
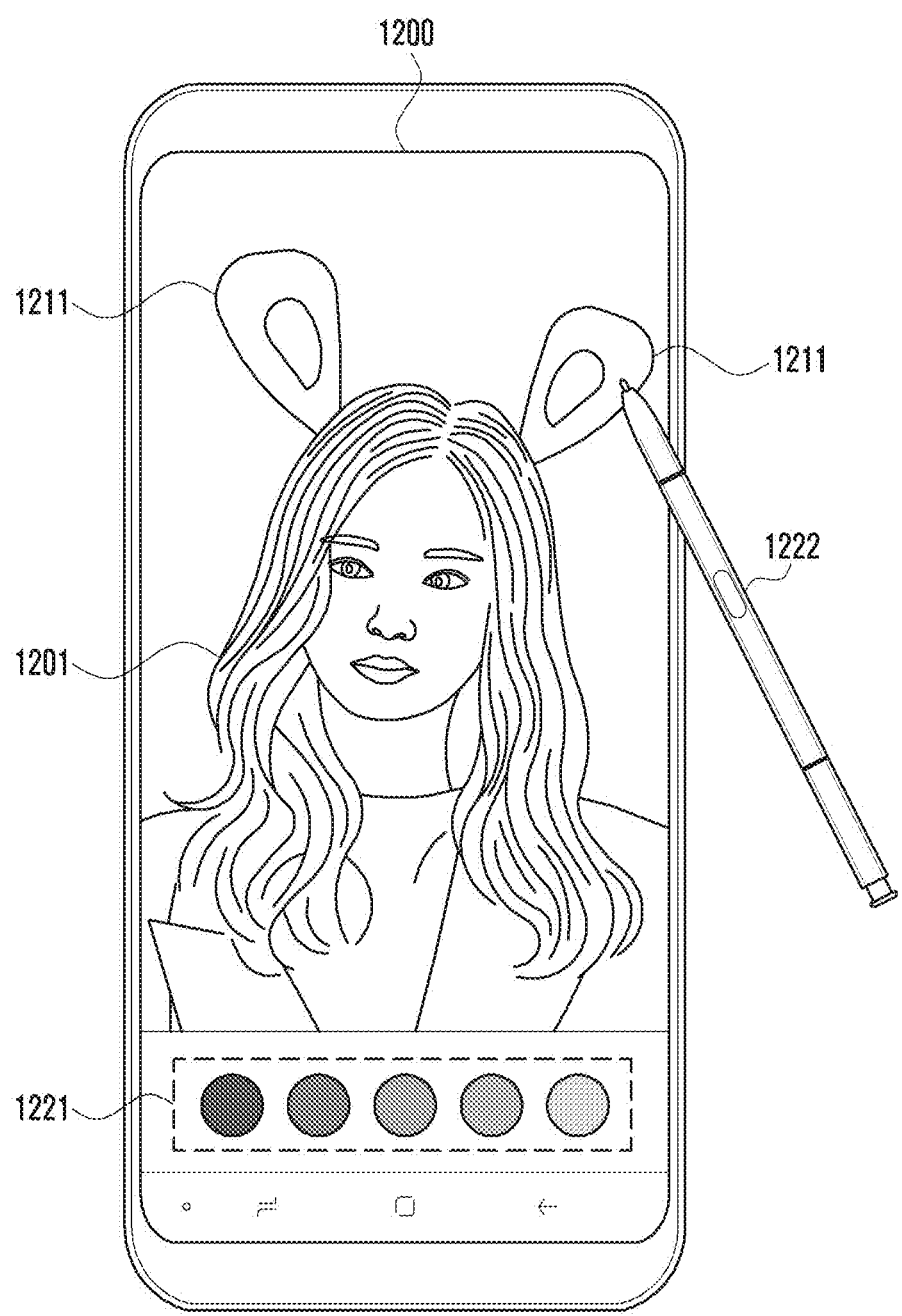
FIGS. 12A and 12B illustrate examples of generating and displaying content in an electronic device according to various embodiments of the disclosure.
Figure 12B:
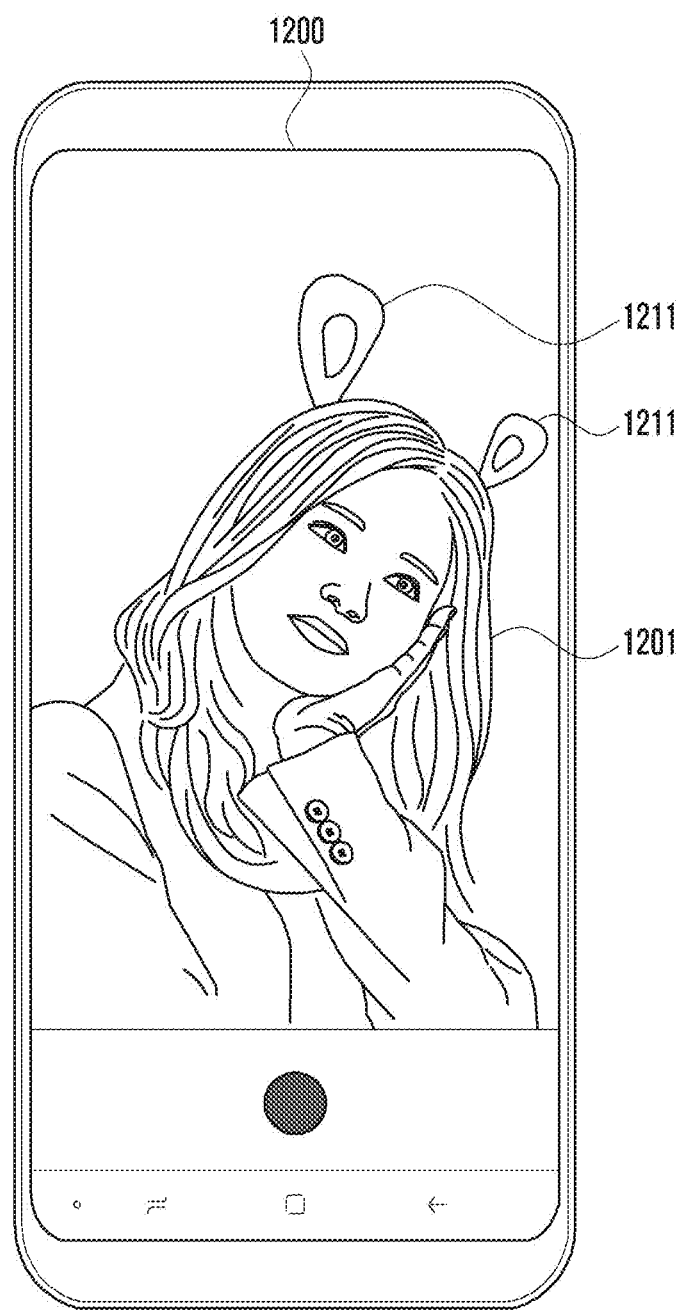

FIGS. 12A and 12B illustrate examples of generating and displaying content in an electronic device according to various embodiments of the disclosure.

Referring to FIG. 12A, a screen representation for creating and/or editing at least one content 1211 using a content generation tool 1221 is illustrated. In various embodiments, the processor 120 may obtain an image including at least one object 1201 and provide the content generation tool 1221.

In various embodiments, the processor 120 may receive a first user input for generating or editing the at least one content 1211 using the content generation tool 1221. For example, the user may enter a drawing input on a display 1200 by using a pen 1222.

Referring to FIG. 12B, an example of displaying an image to which the content 1211 is synthesized on the display 1200 is illustrated. The processor 120 may continuously control the content 1211 based on the attribute information of the content 1211. For example, the processor 120 may control the content 1211 being displayed based on at least one of 3D model information or animation information.

In various embodiments, the processor 120 may check the state of the electronic device 101 by using an acceleration sensor or an optical flow of the second image, estimate the motion of the object 1201 based on the state of the electronic device 101, and move at least one displayed content 1211 according to the estimated motion.

In various embodiments, the processor 120 may modify the content 1211 based on the movement of the feature point. For example, the processor 120 may continuously modify the size and/or ratio of the content 1211 based on the movement distance of each feature point and/or a change in the ratio between the feature points.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, terms such as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a display;
a processor operatively connected to the display and the camera; and
a memory operatively connected to the processor,
wherein the memory stores instructions that, when executed, cause the processor to:
display a first image obtained through the camera,
detect a designated region including at least one object related to content generation in the first image,
display a guide indicating the designated region and a content generation tool on the display,
remove the display of the first image upon display of the guide and the content generation tool,
receive a first user input for generating or editing at least one content through the displayed content generation tool,
display the at least one content based on the first user input,
determine attribute information about the at least one content at least partially based on the designated region or the first user input, and
store the determined attribute information and the at least one content in the memory, and
wherein the attribute information includes at least one of type information, position information, relative size information, image data information, 3D model information, or animation information about the at least one content.

2. The electronic device of claim 1, wherein the instructions are further configured to cause the processor to:
identify at least one feature point included in the at least one object,
detect a first designated region corresponding to a face based on the at least one feature point, if the at least one feature point includes information related to the face included in the at least one object, and
detect a second designated region corresponding to a body based on the at least one feature point, if the at least one feature point includes information related to the body included in the at least one object.

3. The electronic device of claim 2, wherein the instructions are further configured to cause the processor to:
determine position information about the at least one content at least partially based on the at least one feature point, and store the determined position information as the attribute information or a portion thereof.

4. The electronic device of claim 1, wherein the instructions are further configured to cause the processor to:
determine relative size information of the at least one content with respect to the designated region, and
store the determined relative size information as the attribute information or a portion thereof.

5. The electronic device of claim 1,
wherein the first image further includes depth information, and
wherein the instructions are further configured to cause the processor to:
separate the first image into an object layer including the at least one object and a background layer disposed below the object layer based on the depth information of the first image,
determine type information such that the at least one content is included in one of a first layer disposed above the object layer and a second layer disposed between the object layer and the background layer, and
store the determined type information as the attribute information or a portion thereof.

6. The electronic device of claim 1, wherein the first user input includes a drawing input on the display using a pen or a part of a user's body.

7. The electronic device of claim 1, wherein the instructions are further configured to cause the processor to:
obtain a second image including the at least one object or a different object,
receive a second user input for selecting the stored at least one content,
synthesize at least a portion of the second image and the selected at least one content at least partially based on the attribute information of the selected at least one content, and
display the synthesized second image on the display.

8. The electronic device of claim 7, further comprising an acceleration sensor,
wherein the instructions are further configured to cause the processor to:
check a state of the electronic device by using the acceleration sensor or an optical flow of the second image,
estimate a motion of the at least one object or the different object based on the state of the electronic device, and
move the at least one content being displayed according to the estimated motion.

9. The electronic device of claim 7, wherein the instructions are further configured to cause the processor to:
identify at least one feature point included in the at least one object,
adjust a ratio of the selected at least one content at least partially based on the identified at least one feature point, and
synthesize the adjusted at least one content and at least a portion of the second image.

10. A method for generating content, the method comprising:
displaying a first image obtained through a camera;
detecting a designated region including at least one object related to the content generation in the first image;
displaying a guide indicating the designated region and a content generation tool on a display;
removing the display of the first image upon display of the guide and the content generation tool;
receiving a first user input for generating or editing at least one content through the displayed content generation tool;
determining attribute information about the at least one content at least partially based on the designated region or the first user input;
displaying the at least one content based on the first user input; and
storing the determined attribute information and the at least one content,
wherein the attribute information includes at least one of type information, position information, relative size information, image data information, 3D model information, or animation information about the at least one content.

11. The method of claim 10, wherein the detecting of the designated region in the first image comprises:
identifying at least one feature point included in the at least one object;
detecting a first designated region corresponding to a face based on the at least one feature point, if the at least one feature point includes information related to the face included in the at least one object; and
detecting a second designated region corresponding to a body based on the at least one feature point, if the at least one feature point includes information related to the body included in the at least one object.

12. The method of claim 11, wherein the determining of the attribute information about the at least one content comprises:
determining position information about the at least one content at least partially based on the at least one feature point; and
storing the determined position information as the attribute information or a portion thereof.

13. The method of claim 11, wherein the determining of the attribute information about the at least one content comprises:
determining relative size information of the at least one content with respect to the designated region; and
storing the determined relative size information as the attribute information or a portion thereof.

14. The method of claim 10, wherein the determining of the attribute information about the at least one content comprises:
separating the first image into an object layer including the at least one object and a background layer disposed below the object layer based on depth information of the first image;
determining type information such that the at least one content is included in one of a first layer disposed above the object layer and a second layer disposed between the object layer and the background layer; and
storing the determined type information as the attribute information or a portion thereof.

15. The method of claim 10, wherein the first user input includes a drawing input on the display using a pen or a part of a user's body.

16. The method of claim 10, further comprising:
obtaining a second image including the at least one object or a different object;
receiving a second user input for selecting the stored at least one content;

synthesizing at least a portion of the second image and the selected at least one content at least partially based on the attribute information of the selected at least one content; and displaying the synthesized second image on the display.

17. The method of claim 16, further comprising:

checking a state of an electronic device by using an acceleration sensor or an optical flow of the second image;

estimating a motion of the at least one object or the different object based on the state of the electronic device; and moving the at least one content being displayed according to the estimated motion.

18. The method of claim 16, further comprising:

identifying at least one feature point included in the at least one object;

adjusting a ratio of the selected at least one content at least partially based on the identified at least one feature point; and synthesizing the adjusted at least one content and at least a portion of the second image.

* * * * *